Nov. 6, 1928.  
J. A. PERIALE  
1,690,244  
AUTOMATIC INDICATOR  
Original Filed Dec. 30, 1925    3 Sheets-Sheet 1

John A. Periale
INVENTOR

BY Victor J. Evans
ATTORNEY

Nov. 6, 1928.  1,690,244
J. A. PERIALE
AUTOMATIC INDICATOR
Original Filed Dec. 30, 1925  3 Sheets-Sheet 2
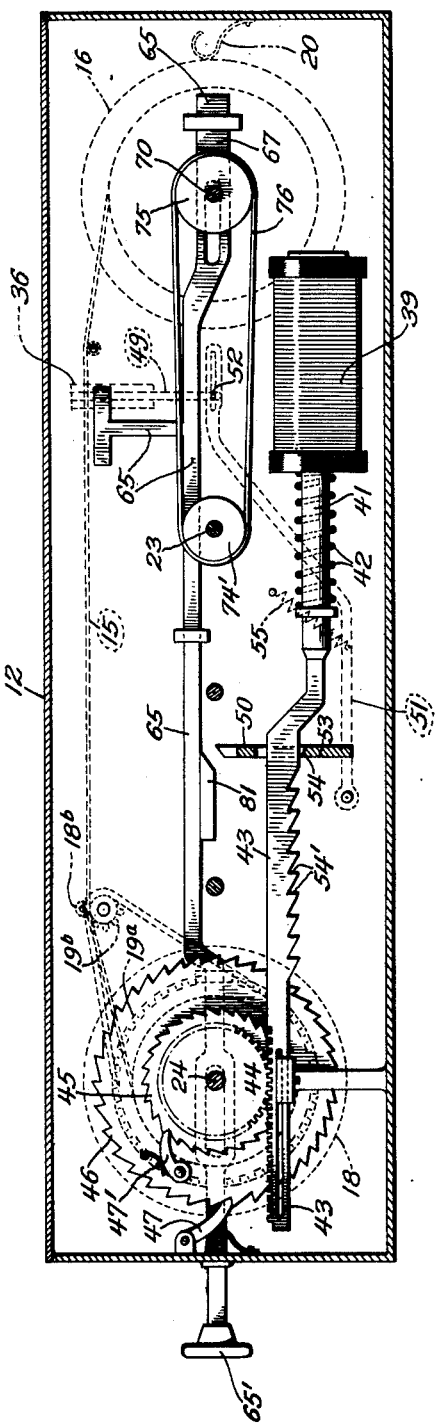
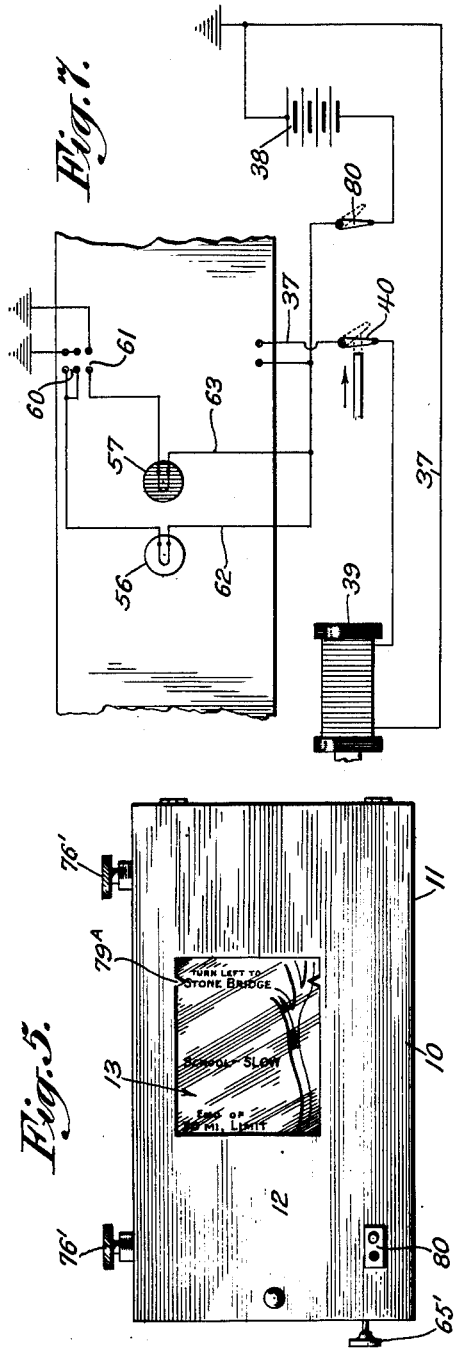
John A. Periale
INVENTOR

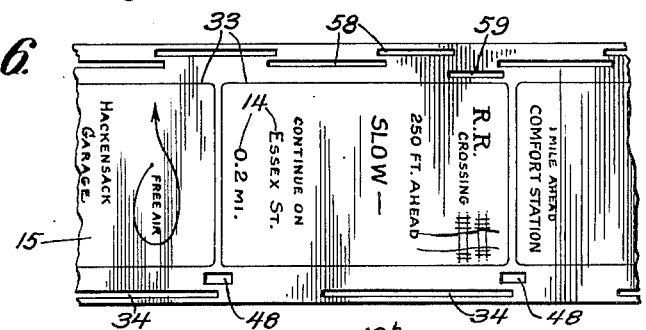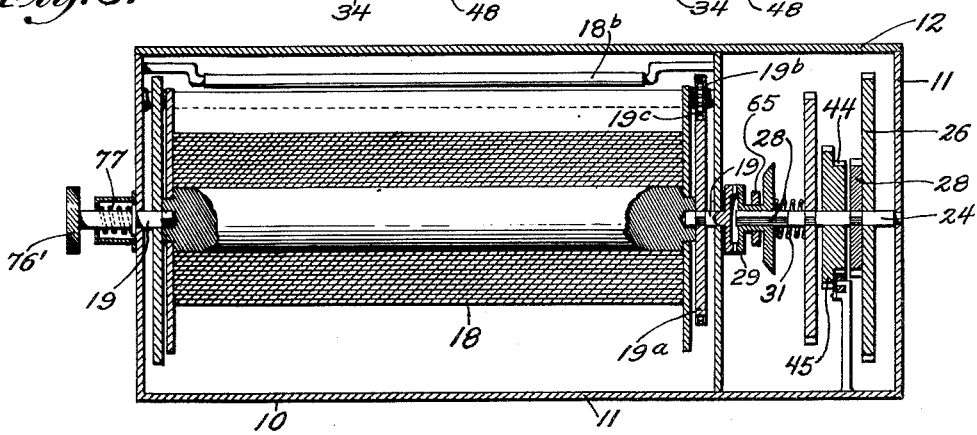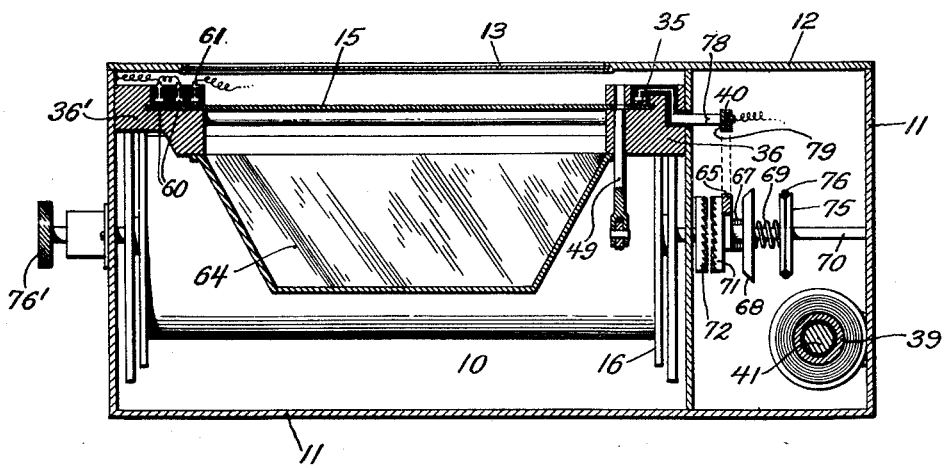

Patented Nov. 6, 1928.

1,690,244

UNITED STATES PATENT OFFICE.

JOHN A. PERIALE, OF ASTORIA, NEW YORK, ASSIGNOR TO THE PERIOMETER CO., INC., OF ASTORIA, LONG ISLAND, NEW YORK, A CORPORATION OF DELAWARE.

AUTOMATIC INDICATOR.

Application filed December 30, 1925, Serial No. 78,436. Renewed February 9, 1928.

This invention relates to improvements in automatic road guides for vehicles and is especially adapted for use upon automobiles for visually indicating the land marks on the route over which the vehicle is adapted to travel. It is also well adapted for displaying a succession of advertisements or other indicia for observation.

Some of the objects of the invention are:— to provide a road guide having a window past which the readable matter contained on a length of tape passes at a very slow rate of speed to allow ample time for the driver or occupants of a vehicle to read the same; to present the readable matter on an enlarged scale; to provide means on the tape for controlling the movement of the tape both slow and fast; to provide a means for synchronizing the tape with the means for driving the same; to provide means for illuminating the indicia on the tape by various color lights for emphasizing the condition of the route over which the vehicle is about to pass; and to provide means for rendering the spool driving means inoperative while the indicia on the tape may be manually adjusted for proper registration with the window opening, should the indicia on the tape be out of proper alignment.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 2 is a vertical longitudinal sectional view on the line 2—2 of Figure 1.

Figure 3 is a vertical transverse sectional view on the line 3—3 of Figure 1.

Figure 4 is a similar view on the line 4—4 of Figure 1.

Figure 5 is a plan view of my invention.

Figure 6 is a detail view of a portion of the tape.

Figure 7 is a diagrammatic view of the electric circuit.

Figure 1:
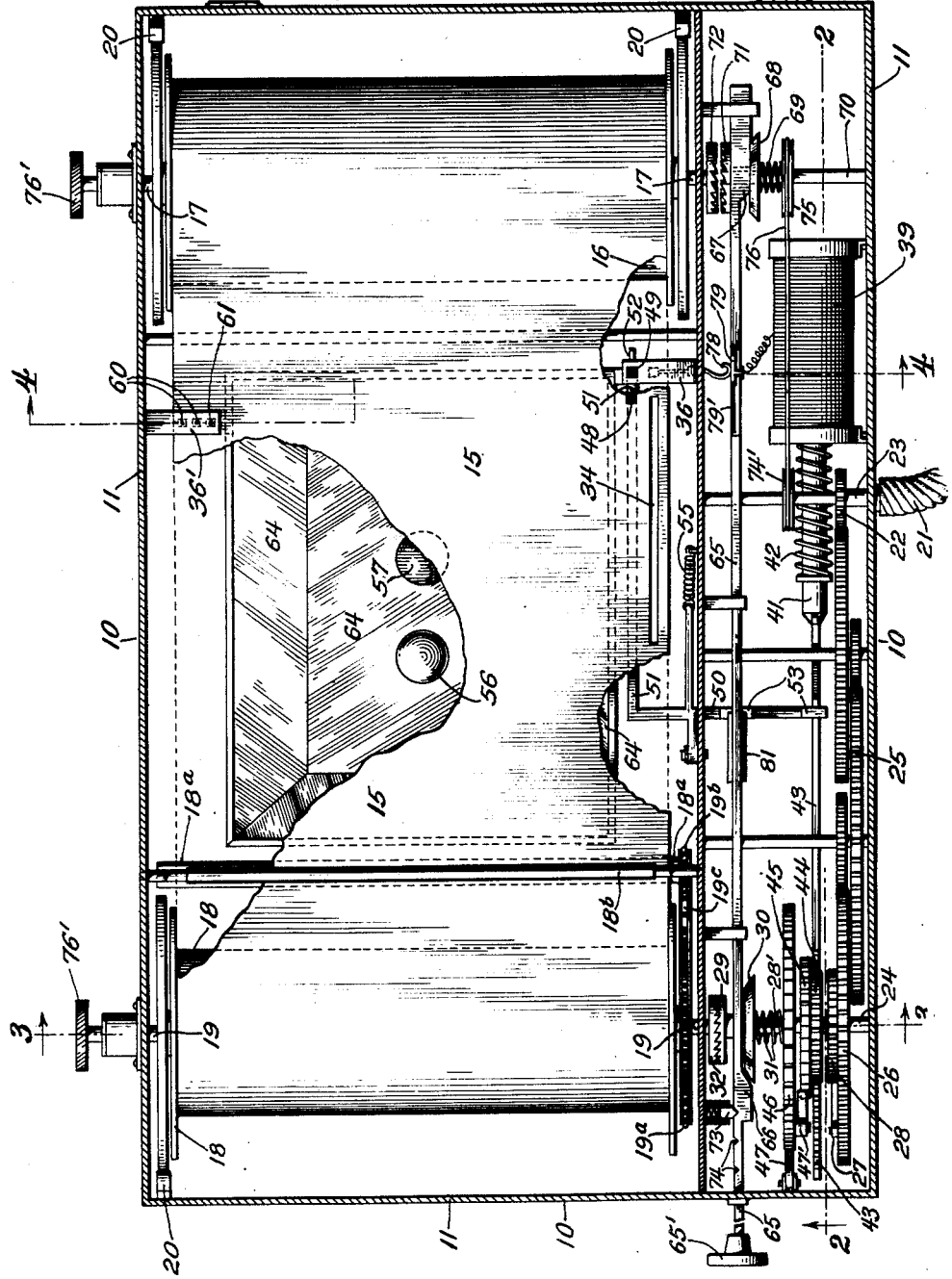
Figure 1 is a horizontal sectional view through my improved automatic indicator adapted primarily for a road guide.

Referring more particularly to the drawing, the reference numeral 10 designates my improved automatic indicator adapted primarily for a road guide in its entirety and which is adapted to be mounted upon the dash board or wind shield of an automobile or any other suitable position within the range of vision of the driver or occupants of the machine. The device 10 includes a casing 11 having a hinge cover 12 provided with a window 13 so as to visibly display indicia 14 carried by a strip of tape 15, normally wound about a spool 16, journalled on trunnions 17 in one end of the casing. The tape is adapted to be drawn from the spool 16 past the window and thence to a winding spool 18 journalled on trunnions 19 mounted at the other end of the casing. Tension springs 20 engage the respective spools for holding the strip taut when passing from one spool to the other.

For driving the spool 18 for winding the tape thereon, I provide a flexible shaft 21 adapted to be operatively connected with one of the wheels of the vehicle, and which transmits a continuous rotation when the vehicle is in motion to a gear 22 fixed to a drive shaft 23 journalled within the casing. A driven shaft 24 is journalled within the casing in axial alignment with the trunnions 19 of the spool 18, and motion is transmitted to this shaft from the gear 22, through a train of reduction gears 25 so as to cause the shaft 24 to normally rotate at a relatively slow rate of speed. The train of gears 25 operates a relatively large gear 26 loosely mounted upon the shaft 24 and which gear carries a pawl 27 for co-action with the teeth on a ratchet wheel 28 fixed to the shaft 24. The ratchet and pawl are adapted to impart a clockwise rotation to the shaft 24 when the vehicle is travelling in a forward direction and to remain idle when backing. One end of the shaft 24 is square in cross section as at 28' and carries a sliding clutch wheel 29 and an integral disk 30 having its periphery beveled. A spring 31 encircles a squared portion of the shaft and tends to normally hold the clutch wheel 29 in co-acting engagement with the mating clutch wheel 32 carried by one of the trunnions 19. From the description thus far, it will be seen that when the clutch wheels are engaged, motion is transmitted from the gear 22 to the shaft 24 through the train of gears 25 and the ratchet wheel and pawl so as to impart a clockwise rotation to the spool 18 for winding the tape thereon from the spool 16.

For effecting an even winding of the tape upon the spool 18, I provide a driven roller 18ª which co-acts with a smaller roller 18ᵇ and between which the tape passes. The spool 18 is rotatable with one of the trunnions 19 while the same may be rotated with respect to the other trunnion 19. Fixed to the last mentioned trunnion is a sprocket wheel 19ª and which sprocket frictionally engages one of the ends of the spool. A relatively smaller sprocket 19ᵇ is attached to the roller 18ª and a chain 19ᶜ passes over the sprockets 19ª and 19ᵇ so as to impart a rotary movement to the roller 18ª from the driving mechanism. The roller 18ª serves to pull the tape past the window at an even rate of speed at all times, irrespective of the amount of tape on the spool while the spool 18 takes up the same.

The indicia 14 of the tape are arranged in groups or sets 33 and are indicative of the land marks of a route over which the automobile is adapted to travel. For instance, the same may set forth the names of the towns, the cross roads and the direction of turns and the like. The indicia on each set must register with the window 13 prior to the time at which the automobile actually reaches these places so as to forewarn the driver. The sets of indicia are brought into successive registration with the window very rapidly but only after the previous sign or set of indicia has been displayed for a reasonable length of time to allow the driver to check up and identify the land marks on the road with those on the tape. For automatically controlling the rapid changing of the signs, I provide suitable elongated slots 34 adjacent one of the side edges of the tape and as the slots are presented at one end of the window, a spring contact 35 passes therethrough and touches a supporting bracket 36 which acts as a ground for closing an electric circuit 37. Arranged within the electric circuit 37 is a source of energy 38 and a solenoid 39 together with a master control switch or circuit breaker 40, which is normally in a closed position for rendering the circuit operative. The core 41 of the solenoid is normally extended and held in such position by an expansion spring 42 interposed between a collar mounted on the core and one end of the solenoid. The core 41 carries a rack 43 which constantly meshes with a gear 44 loosely mounted on the shaft 24, and which gear is fixedly connected with a ratchet wheel 45, which when turned in a contra-clockwise direction imparts rotation to a relatively large ratchet wheel 46 fixed to the shaft 24 and held against a clockwise rotation by a pawl 47. A pawl 47′ is carried by the ratchet wheel 46 and co-acts with the teeth of the ratchet wheel 45 for imparting rotation from the loosely mounted gear 44 to the ratchet wheel 46 which is fixed to the shaft 24. It will be seen that when the circuit is closed and the solenoid energized, the same will be retracted against the tension of the spring 42, thereby causing the rack to impart a rapid rotation to the gear 44 which is imparted to the shaft 24 as above mentioned, causing the roller 18ª and spool 18 to wind the tape a sufficient distance to bring the next sign or set of indicia into registration with the window.

The tape 15 is provided with a second series of slots or perforations 48 along the same longitudinal edge as the slots 34 and which slots 48 are disposed adjacent the ends of the slots 34 but out of alignment therewith. A pin 49 normally extends through one of the slots 48 when the same is in registration therewith, but as the tape is fed along to a point where the slots 34 permit the contact spring 35 to pass therethrough the pin 49 is automatically depressed by the downward movement of a lever to be presently described. The pin is held depressed by the underside of the tape during the rapid changing of the sign, but when the pin is in a raised position the same operates a locking mechanism 50 for limiting the movement of the rack against the action of the energized solenoid whereby to bring the sign or set of indicia into proper registration with the window. The interval of time between the energizing of the solenoid and the operation of the locking mechanism is controlled by the beginning of the slot 48 overlapping the end of the slot 34.

The means 50 above referred to, comprises a pivoted lever 51 operatively connected with the pin 49 through a pin and slot connection 52. The lever carries an arm 53 having an opening therein through which the rack bar 43 passes, one wall of the opening being provided with a tooth surface 54 for coaction with any one of a series of teeth 54′ formed on one side of the rack bar for limiting the extent of movement of the rack bar when the solenoid is energized. As the slot 48 comes into register with the pin 49, the said pin is extended therethrough by the tension placed thereon by a spring 55 which has one end connected with the lever 51 and the other end connected with a part of the casing.

For illuminating the signs as they are brought into register with the window opening, I provide a pair of electric lamps 56 and 57, the lamp 56 adapted to throw off a white light, while the lamp 57 is adapted to indicate red. The lighting of these lamps is controlled by a series of slots 58 and 59 provided on the tape adjacent the edge opposite from that containing the aforementioned slots. Spring contacts 60 and 61 respectively close the circuits 62 and 63 in which the respective lamps are arranged, and which contacts pass through the slots and are grounded on the bracket 36′ for closing the circuits, as the slots are brought into register. These slots are arranged as to cause a white light to appear at all times except when the red light is lighted while the red light is to be illuminated at a crossing or before approaching a dangerous curve. These lights serve to illuminate the indicia on the tape as the lamps are arranged within the casing behind the tape. A reflector 64 is provided for throwing the light from the lamps toward the underside of the tape. For rewinding the tape upon the spool 16 after the same has been fully paid out, I provide a means for rendering the driving mechanism of the device inoperative, and to impart a winding movement to the spool 16 while the vehicle is moving in a forward direction. For this purpose, I employ a rod 65 slidably mounted in the casing, one end of which extends beyond the walls of the casing and is provided with a manipulating knob 65'. The rod is provided with spaced cam surfaces 66 and 67. Normally, when the device is in operation, the cam 66 is out of engagement with the disk 30 while the cam 67 is holding the disk 68 depressed against the action of a spring 69, and which disk 68 is slidably mounted on the square end of a shaft 70 arranged in axial alignment with the trunnions 17. Fixed to the disk 68 is a clutch section 71, normally held out of engagement with the mating clutch section 72 fixed to one of the trunnions 17. The rod is held against movement by a spring pressed pin 73 co-acting with suitable notches 74 on the rod. In the position shown in Figure 1 of the drawings, the device is driving the spool 18, but when the rod is pushed in, the cam 66 forces the disk 30 downward and disengages the clutch wheel 29 from the wheel 32, thus rendering the spool 18 inoperative. Motion is transmitted to the spool 16 by pulleys 74' and 75 fixedly mounted on the respective shafts 23 and 70, and over which shafts a belt 76 passes. As the clutch members 29 and 32 are disengaged, the clutch sections 71 and 72 are engaged as the cam 67 rides off the disk 68 and allows the spring 67 to force the disk and clutch section 71 toward the co-acting clutch section 72. This reverse operation of the respective clutches is accomplished when the rod has been pushed in far enough so that the outer notch 74 co-acts with the pin 73, but when the pin 73 is in the intermediate notch 74, both of the clutches are disengaged, so that the spools may be manually rotated by turning either of the knobs 76' carried by the trunnions for the respective spools. The trunnions which carry the knobs 76' are yieldingly held in engagement with the spools by springs 77 and may be retracted by pulling upon the knobs 76' to remove the trunnions from engagement with the spools, whereby the same may be lifted from the casing and replaced when it is desired to provide a new map.

The circuit breaker 40 above referred to includes a brush 78 which engages a contact 79 on the rod, when the parts are in the position shown in Figure 1 of the drawing, to keep the circuits in a position for operation but when the rod is pushed in, the brush rides upon an insulated part 79' on the rod thus rendering the solenoid circuit inoperative but allowing the circuits through the lamps to remain operative. A control switch 80 is arranged in the circuits so as to render both the lamp circuit and solenoid circuit inoperative.

From the foregoing description, it will be seen that I have provided a road guide in which the indicia upon a length of tape is successively brought into registration with a window for visually displaying the same and should the indicia on the tape accidentally become out of synchronism with the driving mechanism, the same may be manually adjusted in the manner heretofore explained. In Figure 5 of the drawing, I have shown the cover of the casing as being provided with an indicating mark 79ª for coaction by a suitable indicating mark upon the tape for each set of indicia in order to assist in determining whether the indicia on the sign is in proper registration, when these particular points are reached along the route.

A lug 81 depends from the rod 65 for coaction with the arm 54, for depressing the lever for holding the tooth and arm out of the path of movement of the rack during the rewinding of the roller, so that the pin 49 does not pass into the slots during this operation.

In the operation of the device, the roller 16 containing the tape is positioned within the machine and the free end of the tape fed past the window and attached to the winding roller 18 and is manually wound thereon by the turning of the knob 76', it being understood that the rod 65 has been moved to the position to disengage the clutch sections 29 and 32. The first set of indicia is then brought into register with the window in the casing, after which the rod 65 is actuated to allow the clutch sections to engage and to place the solenoid circuit in condition for operation. The vehicle is now placed in motion which causes a relatively slow turning movement to be imparted to the spool 18 through the driven gear 22 and gear train 25 to the shaft 24. As the winding roller slowly pulls the tape past the window, the slot 34 will begin to register with the contact 35 to close the solenoid circuit in order to energize the solenoid causing the rack 43 to impart a rapid rotation to the winding roller through the gear 44, ratchet 45, pawl 47' and ratchet 46, which latter ratchet is keyed to the shaft 24. The limit of movement of the rack which controls the changing of the signs is controlled by the entering of the pin 49 in the slot 48, which causes the spring 55 to move the arm 53 of the lever 51 into locking engagement with the teeth 54' on the rack bar. This automatically brings each successive set of indicia into proper registration with the window as the vehicle passes over the prescribed route. It might further be stated that the respective slots 34 and 48 are arranged to cause the opening of the solenoid circuit to deenergize the same simultaneous to the entering of the pin 49 into the slot 48 as the said pin moves upward only for an instant to effect stopping of the tape to prevent the indicia thereon from passing the window due to the high speed rotation imparted to the roller 18 by the solenoid as above set forth. It will therefore be seen that when the solenoid is deenergized, the spring 42 will draw the solenoid armature to the position shown in Figure 2 of the drawings, thus causing the angular face of the tooth of the series of teeth 54' to force the arm 53 downward and thus rock the lever 51 to retract the pin 49 and permit the tape to again move slowly through the gear train connection until the corresponding slots are again brought into registration with the contacts and pin.

What is claimed as new is:—

1. An automatic indicator including a casing having a window therein, a pair of spools journalled therein, one of said spools constituting a winding spool and the other the paying out spool, a strip of tape normally wound about said paying out spool for winding on said winding spool, sets of indicia on said tape, means for imparting a slow movement to said winding spool for a predetermined length of time, and means for imparting a rapid rotation to said winding spool to bring the respective sets of indicia into register with said window, said last means including a driven shaft operatively connected with said winding spool, a gear loosely mounted on said driven shaft, an electrically controlled rack engaging said gear, and ratchet means between said gear and said driven shaft for imparting a clockwise rotation thereto.

2. An automatic indicator including a casing having a window therein, a pair of removable spools journalled within said casing on opposite sides of said window, a strip of tape adapted to pass from one spool to the other, sets of indicia on said tape, a drive shaft, a driven shaft, a gear train for imparting relatively slow clockwise rotation to said driven shaft from said drive shaft, clutch means between one of said spools and said driven shaft, a second driven shaft, means for imparting counter-clockwise rotation to said second driven shaft from said drive shaft, clutch means between said second driven shaft and said other spool, and manual operable means for selectively controlling the respective clutch means for rendering either of them operative or inoperative, or both inoperative, and electro-magnetic controlled means responsive to slots provided in said strip of tape for imparting a rapid rotation to said first driven shaft independently of said drive shaft.

3. A route indicator comprising an indicating tape, means for advancing the same slowly, and means for rapidly advancing the tape intermittently comprising a ratchet wheel in operative connection with the tape advancing means, a pawl moving with the ratchet wheel, a ratchet wheel engaged by the moving pawl, an electric motor and connections to rotate the latter ratchet wheel and thus the former ratchet wheel, an electric circuit including the motor, and circuit closing devices arranged at intervals on the tape intermittently to vitalize the electric motor and rapidly advance the ratchet wheels and tape.

4. A route indicator comprising an indicating tape formed with a longitudinal line of slots at intervals corresponding to certain indicia, means for advancing the tape slowly and means for rapidly advancing the tape intermittently comprising a ratchet and pawl mechanism in gear with the tape advancing means, an electric motor to actuate when vitalized the ratchet and pawl mechanism and tape, an electric circuit including the motor, and a circuit closer cooperating with the slots in the tape intermittently to close the circuit and vitalize the motor.

5. A route indicator comprising an indicating tape formed with two longitudinal lines of alternating slots, one line of long slots corresponding to certain indicia, means for advancing the tape slowly, means for rapidly advancing the tape intermittently comprising a ratchet and pawl mechanism in gear with the tape advancing means, an electric motor to actuate when vitalized the ratchet and pawl mechanism and tape, an electric circuit including the motor, a circuit closer cooperating with the long slots in the tape intermittently to close the circuit and vitalize the motor, and a locking device to engage and limit the rapid tape advancing mechanism, cooperating with the shorter slots.

6. In a picture display device, a tape having a series of separate adjacent pictures thereon, a support for said tape having a display aperture of substantially the same size as said pictures and with which said pictures are adapted to successively substantially register to be displayed, means for relatively quickly moving said tape from one picture-register position to the next picture-register position, and means for moving said tape substantially imperceptibly a short distance during a substantial picture-register position.

7. In a picture display device, a tape having a series of separate adjacent pictures thereon, a support for said tape having a display aperture of substantially the same size as said pictures and with which said pictures are adapted to successively substantially register to be displayed, first devices for relatively quickly moving said tape from one picture-register position to the next picture-register position, second devices for moving said tape substantially imperceptibly a short distance during a picture-register position, and means for controlling said first devices by movement of said tape.

8. In a picture display device, a support having a display aperture, a conveyor having a series of separate adjacent pictures mounted thereon, each picture being of substantially the same size as said aperture and adapted to successively substantially register therewith, devices for imparting a slow movement to said conveyor during picture-register position so as not to interfere with observance of said picture, devices for quickly and successively changing the picture to be observed in picture-register position.

9. In a display device, a support having a display aperture, a conveyor having a series of separate adjacent pictures mounted thereon, each picture being of substantially the same size as said aperture and adapted to successively substantially register therewith, first devices for imparting a slow movement to said conveyor during picture-register position so as not to interfere with observance of the picture, second devices for quickly and successively changing the picture to be observed in picture-register position, and means including said first devices for controlling said second devices.

In testimony whereof I have affixed my signature.

JOHN A. PERIALE.